United States Patent
Feng et al.

(10) Patent No.: US 11,753,503 B2
(45) Date of Patent: Sep. 12, 2023

(54) SUPPORTED ONIUM SALTS AS INITIATORS FOR THE SYNTHESIS OF POLYCARBONATES BY COPOLYMERIZATION OF CO2 WITH EPOXIDES

(71) Applicant: King Abdullah University of Science and Technology, Thuwal (SA)

(72) Inventors: Xiaoshuang Feng, Thuwal (SA); Naganatha Patil, Thuwal (SA); Caroline Luciani, Thuwal (SA); Yves Gnanou, Thuwal (SA); Nikos Hadjichristidis, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 387 days.

(21) Appl. No.: 17/051,292

(22) PCT Filed: May 17, 2019

(86) PCT No.: PCT/IB2019/054109
§ 371 (c)(1),
(2) Date: Oct. 28, 2020

(87) PCT Pub. No.: WO2019/220414
PCT Pub. Date: Nov. 21, 2019

(65) Prior Publication Data
US 2021/0070932 A1  Mar. 11, 2021

Related U.S. Application Data

(60) Provisional application No. 62/672,807, filed on May 17, 2018.

(51) Int. Cl.
*C08G 64/34* (2006.01)
*C08G 65/10* (2006.01)
*C08G 65/26* (2006.01)

(52) U.S. Cl.
CPC .......... *C08G 65/105* (2013.01); *C08G 64/34* (2013.01); *C08G 65/2603* (2013.01); *C08G 65/2693* (2013.01)

(58) Field of Classification Search
USPC ....................................................... 528/405
See application file for complete search history.

(56) References Cited

U.S. PATENT DOCUMENTS

| | | |
|---|---|---|
| 3,511,890 A | 5/1970 | Reusser |
| 4,503,195 A | 3/1985 | Bauld et al. |
| 4,940,760 A | 7/1990 | Boettcher et al. |
| 4,985,340 A * | 1/1991 | Palazzotto ........... C08G 18/637 522/66 |
| 5,653,922 A | 8/1997 | Li et al. |
| 6,713,599 B1 | 3/2004 | Hinz et al. |
| 6,815,529 B2 | 11/2004 | Zhao et al. |
| 6,844,287 B2 | 1/2005 | Meng et al. |
| 7,304,172 B2 | 12/2007 | Coates et al. |
| 8,093,351 B2 | 1/2012 | Coates et al. |
| 2011/0207909 A1 | 8/2011 | Jeong et al. |

FOREIGN PATENT DOCUMENTS

| | | | |
|---|---|---|---|
| CN | 1150764 A | 5/1997 | |
| CN | 101687987 A | 3/2010 | |
| CN | 105268484 A | 1/2016 | |
| WO | WO-199503338 A1 * | 2/1995 | ............. C07F 5/027 |
| WO | 2008136591 A1 | 11/2008 | |
| WO | 2009130470 A1 | 10/2009 | |
| WO | 2011144523 A1 | 11/2011 | |
| WO | 2016203408 A1 | 12/2016 | |

OTHER PUBLICATIONS

"Non-Final Office Action received for China Patent Application No. 201980032738.7, dated May 27, 2022", 201980032738.7_OARN-CN_05_27_2022, Dec. 25, 2020, 3 pages.
Tomoi, et al., J. Am. Chem. Soc., 1981, vol. 103, No. 13, 3821-3828.
"Communication pursuant to Article 94(3) EPC Received mailed on Feb. 13, 2023", for EP Application No. 19740422.1, 6 Pages.
"Search Report and Written Opinion for PCT/IB2019/054109 dated Aug. 29, 2019".

* cited by examiner

*Primary Examiner* — Terressa Boykin
(74) *Attorney, Agent, or Firm* — Billion & Armitage

(57) ABSTRACT

Supported onium salts used as initiators for the synthesis of polycarbonates by copolymerization of carbon dioxide with epoxides are described. Embodiments of the present disclosure describe initiators comprising an insoluble portion including an onium cation attached to an insoluble support; and an anion, wherein the anion is a counter-ion to the onium cation. Embodiments further describe methods of making polycarbonates using the initiator, methods of making initiators, and the like.

19 Claims, 15 Drawing Sheets

SUPPORTED ONIUM SALTS AS INITIATORS FOR THE SYNTHESIS OF POLYCARBONATES BY COPOLYMERIZATION OF CO2 WITH EPOXIDES

BACKGROUND

Carbon dioxide ($CO_2$) is an abundant, inexpensive, and non-toxic renewable C1 resource for the production of value-added chemicals and materials. In 1969, it was discovered that $CO_2$ could be incorporated into the polymer chain to form polycarbonates through its copolymerization with epoxides. Since then, progress in this area has led to catalyst compounds based on transition metals or earth-abundant main group metals such as, Zn, Co, Cr, Mg, or Al, which are either insoluble or soluble in the reaction system during copolymerization. In this context, the production of polycarbonates or polyols, depending on the catalysts used, have included heterogeneous catalysts represented by zinc glutarate and double metal cyanides (DMCs), and homogeneous ones represented by cobalt and chromium with salen ligands. Homogeneous catalysts are generally more active and are of higher selectivity compared to heterogeneous ones. Whatever the catalysts considered in such copolymerizations, the polycarbonates produced are contaminated with metals, which result in color and toxicity. A post-polymerization removal step is necessary to remove the metals for stability and broad applicability, especially in the commodity areas including Sacrificial Binder, Electronic Processing, and Packaging.

A big improvement was made to produce the polycarbonates through copolymerization of epoxides and $CO_2$ under metal free conditions, as patent filed in WO2016203408A1. In this case, onium salts commercial available triethylboron were respectively used as initiator and activator for the epoxides during copolymerization, therefore, not only multi-step synthesis of catalysts were avoid, but also there is no concern of metal residue in the final obtained polycarbonate products.

Further, one major application of aliphatic polycarbonates is to provide polycarbonate diol precursors for polyurethane synthesis. The synthesis of polyurethane requires molar masses of polycarbonates in the range of 1,000 to 10,000 g/mol. To obtain such low molar mass of polycarbonates, high loading of initiators (onium salts) with respect to epoxide monomers is needed, which increases the cost of production of these aliphatic polycarbonates.

It would be desirable to provide initiators that may be used to form high and low molar mass polycarbonates that are cleaner and more cost-effective than conventional methods.

SUMMARY

In general, embodiments of the present disclosure describe initiators for making polycarbonates, methods of making polycarbonates using the initiators, methods of making the initiators, and the like.

Accordingly, embodiments of the present disclosure describe an initiator comprising an insoluble portion including an onium cation attached to an insoluble support; and an anion, wherein the anion is a counter-ion to the onium cation.

Embodiments of the present disclosure further describe a method of making a polycarbonate comprising contacting a cyclic monomer and a $CO_2$ in a presence of an activator and an initiator to form a polycarbonate (e.g., in solution); wherein the initiator comprises an insoluble portion including an onium cation attached to an insoluble support, and an anion as a counter-ion to the onium cation; optionally contacting the polycarbonate solution with a deactivating agent to deactivate one or more of the initiator and activator; optionally separating at least the insoluble portion of the initiator from at least the polycarbonate; optionally treating the insoluble portion of the initiator with a treatment solution to regenerate the anion; optionally treating the polycarbonate solution sufficient to precipitate the polycarbonate; and optionally separating the crude precipitates from at least the water and acids to obtain the polycarbonates.

Another embodiment of the present disclosure is a method of making an initiator comprising contacting two or more monomers in an aqueous solution to form insoluble copolymer beads by suspension polymerization; mixing the insoluble copolymer beads in a solvent suitable for forming a dispersion; and adding one or more initiator precursors to the dispersion to form the initiator, wherein the initiator precursors include one or more of an onium salt, onium cation, and anion.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Figure 1:
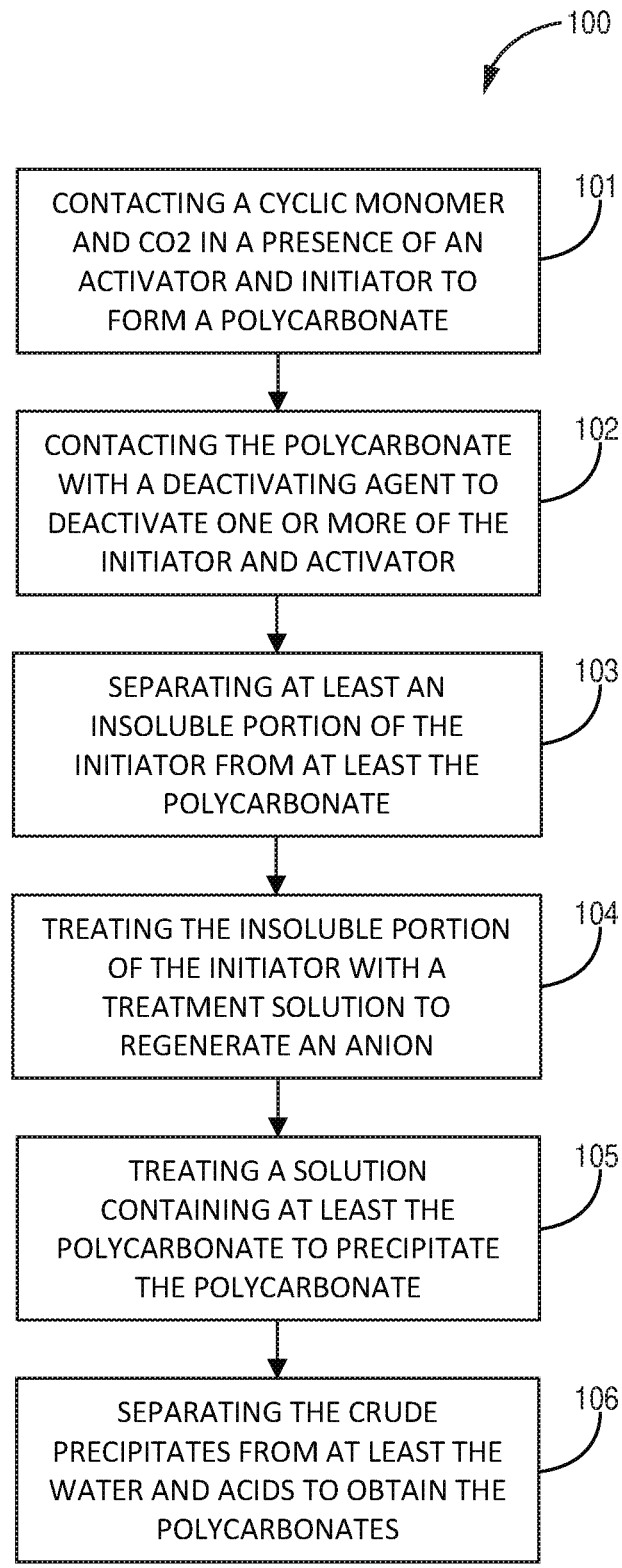
FIG. 1 is a method of making a polycarbonate, according to one or more embodiments of the present disclosure.

The invention of the present disclosure relates to initiators and/or initiating systems for the synthesis of polycarbonates. In particular, the invention of the present disclosure relates to insoluble initiators. The initiators described herein may include an onium salt immobilized and/or supported on an insoluble support. For example, the initiators may include an onium cation attached to an insoluble support, and an anion, wherein the anion is a counter-ion to the onium cation. The onium cation's attachment to the insoluble support may render the onium cation insoluble in the reaction medium used to form polycarbonates, whereas the anion may be used to initiate the polymerization reaction. The insoluble portion of the initiator, which includes the onium cation attached to the insoluble support, may be recovered (e.g., separated by filtration, centrifugation, etc.) from the reaction medium, regenerated with an anion, and reused in the synthesis of polycarbonates.

The invention of the present disclosure also relates to methods of making polycarbonates. For example, a cyclic monomer (e.g., an epoxide monomer) and carbon dioxide may be contacted in a presence of an initiator and an activator (e.g., an initiating system, which comprises an initiator and an activator) to form polycarbonates by anionic copolymerization. While high molar mass polycarbonates may be formed using the initiators and/or initiating systems of the present disclosure, polycarbonates with a low molar mass in the range of about 1,000 g/mol to about 10,000 g/mol may be of particular interest. For example, conventional methods of making low molar mass polycarbonates require a high loading of initiators with respect to epoxide monomers. Such initiators in those conventional methods are soluble and accordingly washed away after synthesis of the polycarbonates. The initiators of the present disclosure, however, are insoluble and accordingly may be recovered, regenerated, and reused to form additional low molar mass polycarbonates. The recyclability of the insoluble initiators of the present disclosure provides a novel method to fabricating low molar mass polycarbonates (e.g., aliphatic polycarbonates, polycarbonate diols, etc.) that is cleaner, lower in cost, and more economical, among other things, than conventional methods.

The invention of the present disclosure further describes novel methods of making initiators. In particular, the invention of the present disclosure describes methods of making initiators with onium salts attached to insoluble polymeric beads, such as insoluble copolymer beads. The initiators in the form of onium salts attached to insoluble copolymer beads may be readily and easily recovered from a reaction mixture and/or solution by filtration, centrifugation, and any other techniques known in the art.

Definitions

The terms recited below have been defined as described below. All other terms and phrases in this disclosure shall be construed according to their ordinary meaning as understood by one of skill in the art.

As used herein, "polycarbonate" refers to a general class of polymers containing a carbonate moiety.

As used herein, "epoxide" refers to a cyclic ether with a three-atom ring. Examples of epoxides include propylene oxide (PO) and cyclohexene oxide (CHO), and can be used as cyclic monomers.

As used herein, "insoluble support" refers to any carrier that is substantially insoluble in a reaction medium.

As used herein, "onium salt" refers to an onium cation and a counter-ion, such as an anion.

As used herein, "adding" is an example and/or form of "contacting" as defined herein. For example, "adding" may include any process of placing one component in or on another component, joining one or more components with another component, and/or bringing two or more components together, as in contacting. The components may be brought into contact, or immediate or close proximity.

As used herein, "contacting" refers to the act of touching, making contact, or of bringing to close or immediate proximity, including at the cellular or molecular level, for example, to bring about a physiological reaction, a chemical reaction, or a physical change (e.g., in solution, in a reaction mixture, in vitro, or in vivo). Contacting may refer to bringing two or more components in proximity, such as physically, chemically, electrically, or some combination thereof. Adding, mixing, and treating are examples and/or forms of contacting.

As used herein, "mixing" is an example and/or form of contacting. For example, "mixing" may include any process of distributing or contacting two or more components in solution. Mixing may be used for making contact, preventing agglomeration and/or aggregation of one or more species, and/or forming dispersions. Stirring (e.g., using a stir bar) is an example of mixing.

As used herein, "separating" refers to any process of removing a substance from another substance. The substance may be removed in whole or in part from another substance. The result of separating may include isolating or substantially isolating the substance from the another substance or concentrating the substance. Filtration and centrifugation are examples of separating.

As used herein, "treating" refers to any process of subjecting to a treatment (e.g., by or through contacting) sufficient to regenerate an initiator and/or precipitate a polycarbonate.

Embodiments of the present disclosure describe initiators for use in the synthesis of polycarbonates from a cyclic monomer and a carbon dioxide. The cyclic monomer and carbon dioxide may react in the presence of the initiator and an activator to form high and low molar mass polycarbonates by anionic copolymerization. In particular, the initiators may be used to form polycarbonates of low molar mass (e.g., ranging from between about 1,000 g/mol to about 10,000 g/mol), such as aliphatic polycarbonates. At least one major application of aliphatic polycarbonates is to provide polycarbonate diol precursors for the synthesis of polyurethane, among others. While conventional methods of making aliphatic polycarbonates require high loadings of soluble initiators that are washed away after polycarbonate synthesis, the initiators described herein are insoluble such that the initiators may be separated, regenerated, and reused in the anionic copolymerization of low molar mass polycarbonates, among other polycarbonates.

The initiators may comprise an onium salt and an insoluble support. The onium salt may include an onium cation and an anion, wherein the anion as a counter-ion to the onium cation. The onium cation may be attached to a surface or other area of the insoluble support. For example, the onium cation may be chemically attached to the insoluble support through a covalent bond, among other bonds, such that the onium cation is supported and/or immobilized on the insoluble support. The attachment of the onium cation to a support that is insoluble in the reaction medium similarly renders the onium cation insoluble in the reaction medium. Accordingly, the onium cation and insoluble support may constitute an insoluble portion of the initiator. For example, the insoluble portion of the initiator may include an onium cation attached to an insoluble support. The counter-ion, or anion, may be free and/or available to dissociate from the onium cation sufficient to initiate copolymerization.

The onium cation may include one or more of nitrogen, phosphorus, and sulfur. For example, the onium cation may include one or more of ammonium, phosphonium, and sulfonium. In many embodiments, the ammonium is a quaternary ammonium cation. The quaternary ammonium cation may be characterized by the chemical formula $NR_4^+$. The phosphonium may be characterized by the chemical formula $PR_4^{3O}$. The sulfonium cation may be characterized by the chemical formula $SR_3^+$. The anion may include any suitable anion, such as halides and —OH groups. In many embodiments, the anion may include one or more of $Cl^-$, $F^-$, $Br^-$, $HO^-$, $RO^-$, $RCO_2^-$, and $HCO_3^-$. In preferred embodiments, the anion may include one or more of $Cl^-$ and $HO^-$.

The support may include any material that is insoluble in the reaction medium and/or suitable for attaching to the onium salt (e.g., onium cation) such that the insoluble portion of the initiator may be separated (e.g., by filtration or centrifugation) from the reaction medium, regenerated, and/or reused. The support may be provided in any form. In preferred embodiments, the insoluble support may be provided in the form of insoluble copolymer beads. The insoluble support may include an organic material, inorganic material, or a combination thereof. For example, the insoluble support may include one or more of a polymeric surface, silica surface, or any other inactive surface including polymer-modified metal surfaces suitable for rendering the onium cations insoluble in the reaction medium and thus easy to recover therefrom and reused in the synthesis of polycarbonates. In many embodiments, the insoluble support is a polymeric support. For example, the insoluble support may include one or more of polystyrenes, polydimethylsiloxanes, polyamides, polyesters, polyvinylpyridinium salts, polyethylene oxides, polyethers, acrylic polymers, polysulfonates, polyolefins, and polysulfides. In preferred embodiments, the insoluble support is a crosslinked polymeric support. In other embodiments, the insoluble support may include one or more of silica, aluminosilicate, zeolite, alumina, alumina-silica, titania, zirconia, ceria-zirconia, talc, magnesia, niobium oxides, tantalum oxides, molybdenum oxides, and tungsten oxides.

A size of the initiator (e.g., insoluble polymeric/inorganic beads) may range from a few hundred nanometers to a few millimeters. The size of the initiator may selected such that the initiator may be recovered by filtration. In many embodiments, the size of the initiator may be at least about 200 nm and/or less than about 3 mm. In other embodiments, the initiator may be less than about 200 nm and/or greater than about 3 mm.

In an embodiment, the onium salt may be characterized by the following chemical formula:

$$Q^+(R)_nX^-,$$

where Q is N, P, or S; R is a butyl, octyl, phenyl group or other alkyl group; n is 3 or 4; and X is Cl, OH, F, Br, RO, $RCO_2$, or $HCO_3$. For example, in an embodiment, the onium salt may include one or more of a quaternary ammonium chloride salt and quaternary ammonium hydroxide salt.

In an embodiment, the initiator may include be characterized by the following chemical formula:

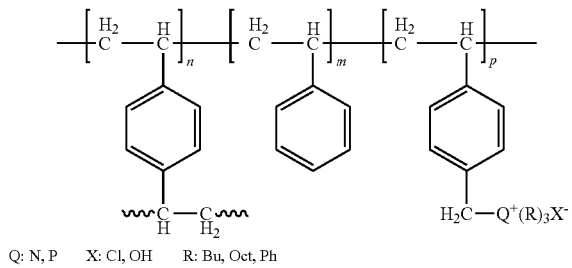

Q: N, P    X: Cl, OH    R: Bu, Oct, Ph

Embodiments of the present disclosure also describe initiating systems. For example, the initiators may be paired and/or combined with activators to form initiating systems. The initiating systems may be used to activate a cyclic monomer and a carbon dioxide to form polycarbonates by anionic copolymerization. For example, the initiator and activator may form an ate complex, wherein the ate complex activates the carbon dioxide. The activator may be used for activation of the cyclic monomer. The copolymerization may be allowed to proceed and form polycarbonates of a select molar mass until the initiating system (e.g., one or more of the initiator and activator) is deactivated. Once deactivated the initiator of the initiating system may be separated from the polycarbonate, regenerated, and reused in the synthesis of polycarbonates.

FIG. 1 is a flowchart of a method of making a polycarbonate, according to one or more embodiments of the present disclosure. As shown in FIG. 1, the method 100 may comprise contacting 101 a cyclic monomer and a $CO_2$ in a presence of an activator and an initiator to form a polycarbonate (e.g., in solution); wherein the initiator comprises an insoluble portion including an onium cation attached to an insoluble support, and an anion as a counter-ion to the onium cation; contacting 102 the polycarbonate solution with a deactivating agent to deactivate one or more of the initiator and activator; separating 103 at least the insoluble portion of the initiator from at least the polycarbonate solution; treating 104 the insoluble portion of the initiator with a treatment solution to regenerate the anion; treating 105 the polycarbonate solution sufficient to precipitate the polycarbonate; and separating 106 the crude precipitates from at least the water and acids to obtain the polycarbonates. Each of steps 102 to 106 are optional. In some embodiments (not shown), prior to the contacting 101, a reaction vessel, such as a vial, may optionally be subjected to an initial treatment sufficient to remove impurities and/or trace impurities. For example, the reaction vessel may be washed with solution and/or heated, optionally under vacuum.

The step 101 includes contacting a cyclic monomer and carbon dioxide in a presence of an initiator and activator. In this step, the cyclic monomer and carbon dioxide may be contacted, in the presence of the initiator and activator, sufficient to form the polycarbonate by anionic copolymerization. Contacting may generally refer to bringing the cyclic monomer and carbon dioxide into physical contact, or immediate or close proximity, in the presence of, for example, the initiator and activator. In many embodiments, the contacting may proceed by adding one or more of the cyclic monomer, carbon dioxide, initiator, activator, and solvent to a reaction vessel. The contacting may proceed with and/or without stifling. The contacting may proceed under reaction conditions suitable for anionic copolymerization of the cyclic monomer and carbon dioxide. The contacting may proceed sequentially, in any order, or simultaneously (e.g., about or substantially simultaneously).

In an embodiment, the contacting may proceed by adding the initiator to a reaction vessel and placed inside a reactor wherein the initiator includes an insoluble portion including an onium cation attached to an insoluble support, and an anion, wherein the anion is a counter-ion to the onium cation. The activator may be separately mixed with a solvent, such as hexane, tetrahydrofuran, toluene, and subsequently added to the reaction vessel. Thereafter, the cyclic monomer may be added to the reactor to assure no contact between monomer and initiating system before charging $CO_2$. Upon the addition of the cyclic monomer to the reactor, one or more of the reaction vessel and reactor may be charged with $CO_2$. In many embodiments, the reaction vessel and/or reactor is charged with $CO_2$ under pressure from 1 bar to 50 bar (e.g., about 10 bar). The reaction conditions may be adjusted to a temperature from 20 to 150° C. (e.g., a constant temperature of about 50° C.). The copolymerization may be allowed to proceed for a sufficient duration (e.g., about 10 h) without stifling in order to form the polycarbonate by anionic copolymerization.

The cyclic monomer may include any cyclic ether and/or cyclic ester, such as epoxides and/or lactones, respectively. For example, the cyclic monomer may include, among others, one or more of propylene oxides, cyclohexene oxides, ethylene oxides, styrene oxides, 1-butene oxides, 1-hexene oxides, 1-octene oxides, glycidyl ethers (e.g., n-butyl glycidyl ethers), lactides, caprolactones, and derivatives thereof. In many embodiments, the cyclic monomer may include an epoxide monomer. The epoxide monomer may be characterized by the following chemical formula:

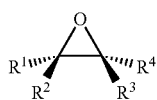

where each of $R_1$, $R_2$, $R_3$, and $R_4$ is independently an alkyl group and/or contains functional groups, such as one or more of halide, vinyl, azide, thiol, ether, ester, ketone, aldehyde, and acid. For example, in some embodiments, the cyclic monomer and/or epoxide monomer may include one or more of the following chemical structures:

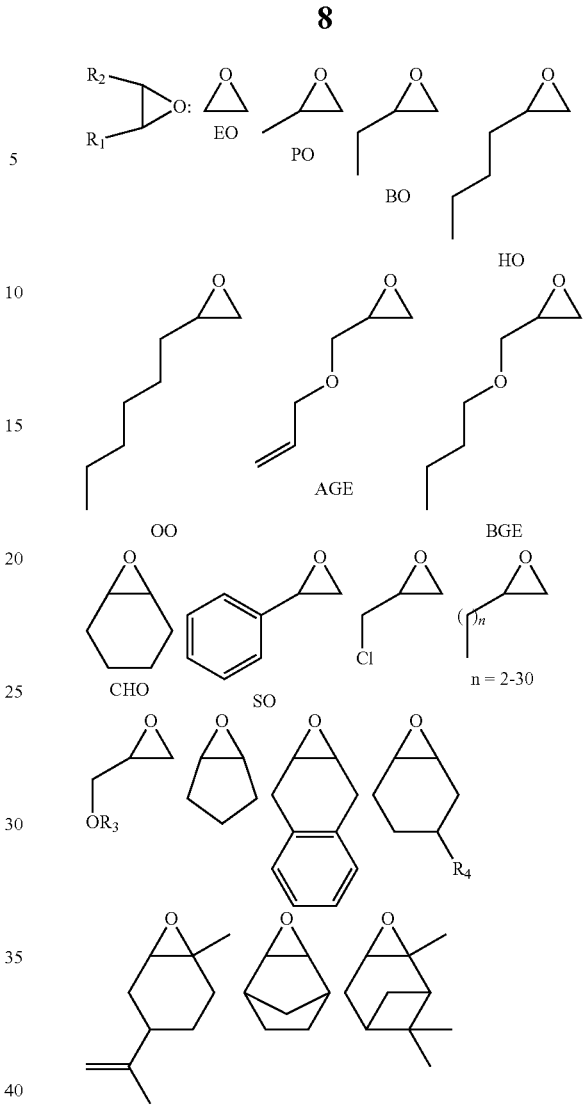

The initiator may include any of the initiators of the present disclosure. For example, the initiator may comprise an insoluble portion including an onium cation attached to an insoluble support, and an anion, wherein the anion is a counter-ion to the onium cation. The insoluble portion of the initiator may remain insoluble and/or substantially insoluble during and/or throughout the entire reaction. For example, the onium cation attached to the insoluble support, either with or without the counter-ion, may remain insoluble in the reaction medium during and/or throughout one or more of initiation, propagation, and termination of the copolymerization. The size of the insoluble portion of the initiator may be suitable for filtration. For example, the size of the insoluble portion of the initiator may range from a few hundred nanometers to a few millimeters. In many embodiments, the initiator is at least about 200 nm in size, such that the initiator may be readily and easily separated, recovered, regenerated, and/or reused in the synthesis of high and/or low molar mass polycarbonates.

The activator or catalyst may include a Lewis acid. The activator may include one or more of an alkyl-substituted boron and an alkyl-substituted aluminum. For example, the activator may include one or more of triisobutyl aluminum, triethyl borane, trialkyl aluminum, trimethyl borane, triisobutylborane, triphenylborane, trialkyl borane, dialkyl zinc, dialkyl magnesium, diethyl zinc, diethyl magnesium, and the ester forms thereof. In many embodiments, the activator may include one or more of a trialkyl boron and a trialkyl aluminum. For example, the activator may be characterized by the following chemical formula:

(R$_1$, R$_2$, R$_3$)—B or (R$_1$, R$_2$, R$_3$)—Al where R$_1$, R$_2$, and R$_3$ is any alkyl group, wherein the alkyl group of one or more of R$_1$, R$_2$, and R$_3$ may be the same or different. In preferred embodiments, the activator may include one or more of triethyl borane, trimethyl borane, triisobutylborane, triphenyl borane, and triisobutyl aluminum.

One or more of the initiator and activator, or an initiating system, may be used to activate the cyclic monomer and carbon dioxide to form the polycarbonate by anionic copolymerization. For example, in many embodiments, the initiator may be used to activate the carbon dioxide through the formation of an ate complex with the activator. The activator may likewise be used in the formation of the ate complex, as well as for the activation of the cyclic monomer. In many embodiments, the activator reacts with the initiator, under stoichiometric conditions, to form the ate complex. Accordingly, it may be important in some embodiments to provide the activator in excess of stoichiometric conditions, such that the stoichiometric amount may be used to form the ate complex and the amount in excess thereof may be used to activate the cyclic monomer. For example, in some embodiments, where an excess of the activator is not provided, copolymerization may not occur. In other embodiments, an excess of the activator is not required and polymerization may proceed in the presence of stoichiometric amounts of the initiator and activator.

An example of a reaction scheme of forming polycarbonates by copolymerizing the cyclic monomer and carbon dioxide in the presence of the initiator and activator is shown in Scheme 1 below. Although the ate complex is excluded from Scheme 1, this shall not be limiting as the ate complex may be formed even though not shown.

Scheme 1

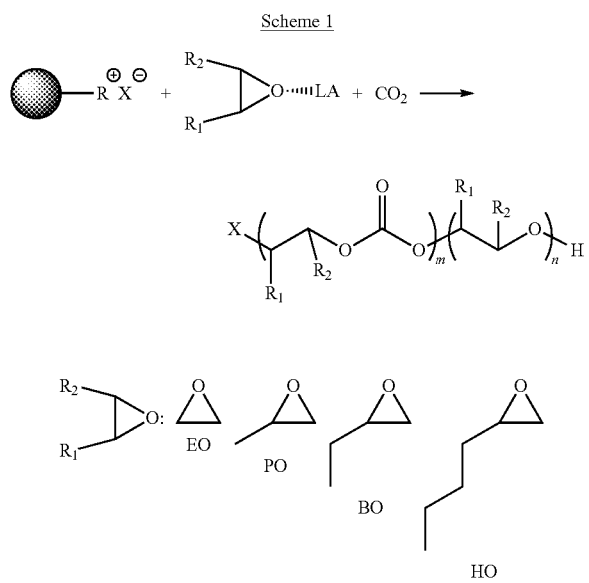

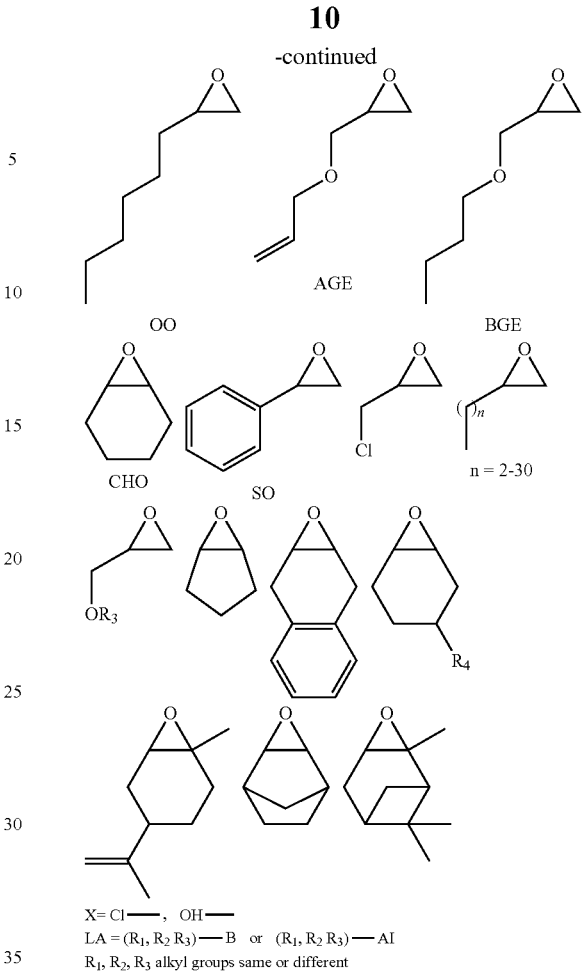

X= Cl——, OH——
LA = (R$_1$, R$_2$ R$_3$)——B or (R$_1$, R$_2$ R$_3$)——Al
R$_1$, R$_2$, R$_3$ alkyl groups same or different The step 102 includes contacting the polycarbonate solution with a deactivating agent to deactivate one or more of the initiator and activator. In this step, the polycarbonate solution may be quenched with a deactivating agent, such as water, acid chloride, etc to match the sorts of anions of the initiator used in order to keep the purity of initiator reused for next batch copolymerization. For example, when initiator was Q$^+$(R)$_n$OH$^-$, water was used as deactivator, when initiator was Q$^+$(R)$_n$Cl$^-$, acid chloride was used to quench reaction.

The contacting step and optionally the deactivating step may result in a solution containing a crude polycarbonate product and the insoluble portion of the initiator, among other things. In many embodiments, the polycarbonate is soluble in the solvent and/or solution, and the initiator is insoluble as the onium cation is attached to an insoluble support. The differences in solubility of the initiator and the polycarbonate may be used to separate and recover the insoluble portion of the initiator for reuse in the synthesis of low and high molar mass polycarbonates.

The step 103 includes separating at least the insoluble portion of the initiator from at least the polycarbonate and/or the polycarbonate solution. The separating may generally refer to separating at least one component from one or more other components. The separation may be achieved by one or more of filtration, centrifugation, and other separation techniques known in the art. In some embodiments, one or more solvents, such as tetrahydrofuran, among others, may optionally be added to dilute the polycarbonate-containing solution prior to separating by filtration and/or centrifugation. In some embodiments, both the insoluble portion of the initiator and any unreacted initiator (e.g., an initiator including the anion) may be separated from the polycarbonate solution. In some embodiments, the polycarbonate solution may further include, among other chemical species, one or more of the polycarbonate, unreacted monomer, dissolved $CO_2$, activator, and solvent.

The step 104 includes treating the insoluble portion of the initiator with a treatment solution to regenerate the anion of the initiator. In this step, the insoluble portion of the initiator that was separated from the polycarbonate and/or polycarbonate solution and that was recovered is treated with a treatment solution to regenerate the anion of the initiator. For example, to regenerate the anion of the initiator, the insoluble portion of the initiator may be contacted with the treatment solution. In many embodiments, the treatment solution may contain at least the anion species of the initiator, such as sodium hydroxide and hydrochloric acid. For example, polystyrene beads with a quaternary ammonium cation may be contacted with sodium hydroxide to regenerate polystyrene beads with quaternary ammonium hydroxide. Similarly, polystyrene beads with a quaternary ammonium cation may be contacted with hydrochloric acid to regenerate polystyrene beads with quaternary ammonium chloride. In this way, the initiators of the present disclosure may be regenerated and copolymerization may resume.

The step 105 includes treating the polycarbonate solution sufficient to precipitate the polycarbonate. This step may include one or more of evaporating a solvent from the solution, re-dissolving the polycarbonate in a solvent, and precipitating the polycarbonate in water or alcohol. Upon precipitating the polycarbonate, the product may be collected and/or dried. For example, in some embodiments, the product may be collected by centrifugation and/or dried under vacuum at about room temperature until constant weight.

The step 106 includes separating the crude precipitates from at least the water and acids to obtain the polycarbonates. Any technique known in the art may be used herein.

In an embodiment, the method of making a polycarbonate may comprise contacting a cyclic monomer and a $CO_2$ in a presence of an activator and an initiator to form a polycarbonate (e.g., in solution); wherein the initiator comprises an insoluble portion including an onium cation attached to an insoluble support, and an anion as a counter-ion to the onium cation; adding a deactivating agent to the solution to deactivate one or more of the initiator and activator after copolymerization; separating at least the insoluble portion of the initiator from the solution containing at least the polycarbonate; and treating the insoluble portion of the initiator with a treatment solution to regenerate the anion of the initiator.

In an embodiment, the method of making a polycarbonate may comprise contacting a cyclic monomer and a $CO_2$ in a presence of an activator and an initiator to form a polycarbonate (e.g., in solution); wherein the initiator comprises an insoluble portion including an onium cation attached to an insoluble support, and an anion as a counter-ion to the onium cation; adding a deactivating agent to the solution to deactivate one or more of the initiator and activator after copolymerization; separating at least the insoluble portion of the initiator from the solution containing at least the polycarbonate; and treating the solution containing at least the polycarbonate to precipitate the polycarbonate.

In an embodiment, the method of making a polycarbonate may comprise contacting a cyclic monomer and a $CO_2$ in a presence of an activator and an initiator to form a polycarbonate (e.g., in solution); wherein the initiator comprises an insoluble portion including an onium cation attached to an insoluble support, and an anion as a counter-ion to the onium cation; adding a deactivating agent to the solution to deactivate one or more of the initiator and activator after copolymerization; separating at least the insoluble portion of the initiator from the solution containing at least the polycarbonate; treating the insoluble portion of the initiator with a treatment solution to regenerate the anion of the initiator; and treating the solution containing at least the polycarbonate to precipitate the polycarbonate.

Figure 2:
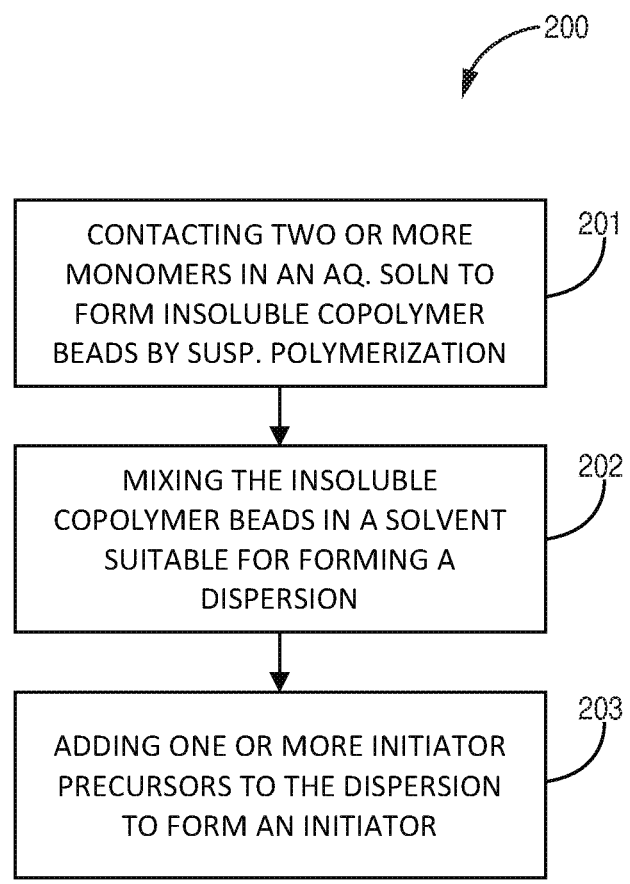
FIG. 2 is a method of making an initiator, according to one or more embodiments of the present disclosure.

FIG. 2 is a method of making an initiator, according to one or more embodiments of the present disclosure. As shown in FIG. 2, the method may comprise contacting 201 two or more monomers in an aqueous solution to form insoluble copolymer beads by suspension polymerization, mixing 202 the insoluble copolymer beads in a suitable solvent to form a dispersion, and adding 203 one or more initiator precursors to the dispersion sufficient to form the initiator, wherein the initiator precursors include at least a trialkylamine or a trialkylphosphine.

The step 201 includes contacting two or more monomers in an aqueous solution to form insoluble copolymer beads by suspension polymerization. The contacting may proceed by adding a mixture of two or more monomers dropwise to an aqueous solution under reaction condition suitable for suspension polymerization. The mixture of two or more monomers may include any monomers of the insoluble polymeric supports of the present disclosure. In many embodiments, the mixture of two or more monomers includes any monomers suitable for forming insoluble supports in a form of polymeric beads. For example, in an embodiment, the monomers may include two or more of styrene, divinylbenzene (DVB), and 4-vinylbenzyl chloride (VBC). The mixture may further include a solvent, such as azobisisobutyronitride, among others. The contacting may optionally proceed under stiffing and/or heating at or to a first temperature (e.g., about 70° C.) for a suitable duration. The temperature chosen depends upon the radical initiator used, at which it could cleave and generate radicals in a reasonable time. The crude insoluble copolymer beads formed by suspension polymerization may be collected by filtration, washed with one or more solvents, and/or dried, optionally under vacuum.

The step 202 includes mixing the insoluble copolymer beads in a suitable solvent to form a dispersion. The solvent may include, for example, dichloromethane, tetrahydrofuran, acetonitrile, among other solvents.

The step 203 includes adding one or more initiator precursors to the dispersion sufficient to form the initiator. The initiator precursor may include any material including trialkylamine, trialkylphosphine. For example, in an embodiment, dichloromethane and tributylamine may be added to the dispersion to form polystyrene beads with quaternary ammonium chloride. In an embodiment, polystyrene beads with quaternary ammonium chloride may be added to an aqueous sodium hydroxide solution to form polystyrene beads with quaternary ammonium hydroxide.

In an embodiment, the method of making a polycarbonate may comprise contacting one or more of styrene, divinylbenzene, and 4-vinylbenzyl chloride in azobisisobutyronitride to form insoluble polystyrene beads by suspension polymerization; mixing the insoluble copolymer beads in dichloromethane to form a dispersion; and adding tributylamine to the dispersion to form an initiator, wherein the initiator includes polystyrene beads with quaternary ammonium chloride. In an embodiment, the method may further comprise adding the polystyrene beads with quaternary ammonium chloride to an aqueous sodium hydroxide solution to form polystyrene beads with quaternary ammonium hydroxide. As example of the reaction scheme for forming polystyrene beads with quaternary ammonium chloride and/or polystyrene beads with quaternary ammonium hydroxide is provided in Scheme 2 below:

Scheme 2

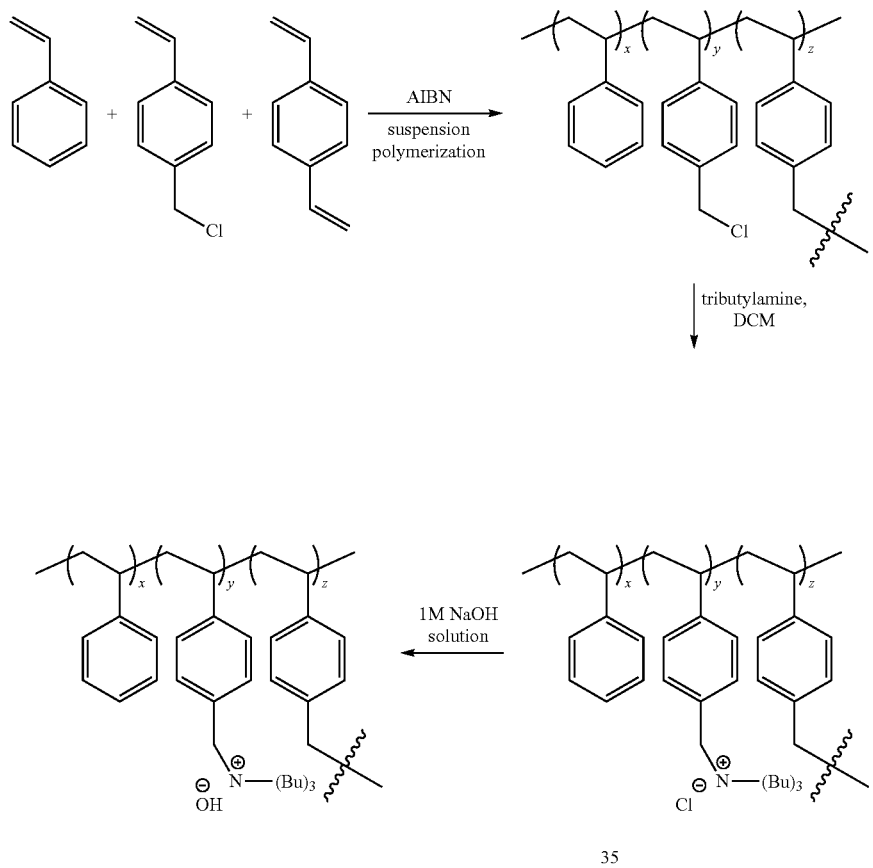

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

EXAMPLE 1

In the present Example, instead of soluble omnium salts used as the initiator that are washed away after the synthesis of polycarbonates as in the case of conventional methods, onium initiator moieties are immobilized onto the support of polymer beads and thus can be recycled several times. For example, see the chemical formula below, illustrating the structure of the insoluble onium initiators:

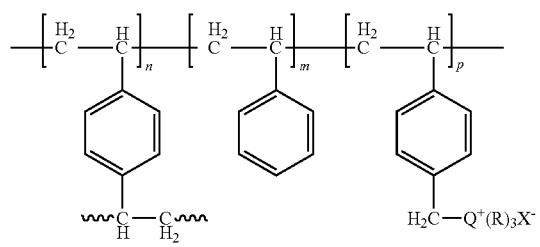

Q: N, P    X: Cl, OH    R: Bu, Oct, Ph

These insoluble initiators can be separated at the end of a polymerization by filtration, among other techniques, and can be reused for another run. The insoluble initiators can be applied to prepare polycarbonate targeting both high and low molar mass, and exhibiting performance similar to the one obtained with soluble onium initiators. These insoluble onium initiators can thus provide polycarbonates cleaner, and more cost effective, especially for the production of low molar mass polycarbonate diols.

The present Example relates to supporting ammonium, or phosphonium salts initiators on a polymeric surface (Scheme 1), silica surface or any other inactive surfaces including polymer-modified metal surfaces that allow cations to be not soluble in the reaction medium and thus to be easily recovered from the latter medium for re-use. Typically these surfaces supporting onium salts for initiation purpose are beads in the range of few hundred nm to few mm. The Example also describes, along with the above initiators, alkyl-substituted boron and alkyl-substituted aluminum Lewis acids that serve as activator/catalyst for the copolymerization of propylene oxide and $CO_2$.

Table 1 below provides copolymerization results of propylene oxide with $CO_2$ activated by triethylborane (TEB) using a heterogeneous initiator at about 50° C.

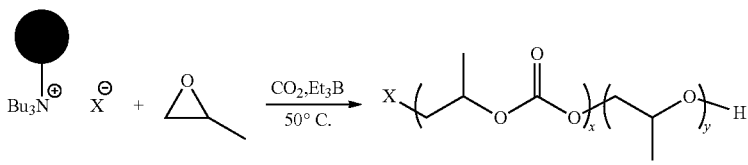

| Entry | Initiators[a] | DP targeted | [Initiator]/[TEB] | Solvent/s | Conversion[b] (%) | PC[c] mol % | Selectivity %[d] | Mn(× 10³)/PDI[e] |
|---|---|---|---|---|---|---|---|---|
| 1 | PS-N(Bu)₃OH | 20 | 1/1.5 | THF:Hexane (1:4) | 100 | 63 | 80 | 1.7/1.5 |
| 2 | PS-N(Bu)₃OH | 20 | 1/1.7 | Hexane | 100 | 97 | 74 | 1.8/1.5 |
| 3[f] | PS-N(Bu)₃OH | 20 | 1/1.7 | Hexane | 100 | 85 | 88 | 2.8/1.2 |
| 4[g] | PS-N(Bu)₃OH | 20 | 1/1.7 | Hexane | 100 | 88 | 91 | 3.8/1.2 |
| 5 | PS-N(Bu)₃OH | 50 | 1/1.5 | THF:Hexane (1:4) | 75 | 97 | 76 | 2.7/1.4 |
| 6 | PS-N(Bu)₃OH | 50 | 1/2 | Hexane | 90 | 94 | 85 | 4.0/1.4 |
| 7[f] | PS-N(Bu)₃OH | 50 | 1/2 | Hexane | 80 | 83 | 90 | 6.3/1.2 |
| 8 | PS-N(Bu)₃Cl | 50 | 1/1.5 | THF:Hexane (1:4) | 100 | 80 | 66 | 4.3/1.2 |
| 9 | PS-N(Bu)₃Cl | 50 | 1/1.7 | Hexane | 100 | 83 | 68 | 5.1/1.1 |
| 10[f] | PS-N(Bu)₃Cl | 50 | 1/2 | Hexane | 100 | 72 | 93 | 8.8/1.3 |
| 11 | PS-N(Bu)₃Cl | 100 | 1/1.7 | Hexane | 100 | 96 | 73 | 9.0/1.1 |
| 12 | PS-N(Bu)₃Cl | 500 | 1/1.3 | THF | 70 | 96 | 91 | 23.1/1.1 |

[a]PS-N(Bu)₃OH: polystyrene beads with quaternary ammonium hydroxide, PS-N(Bu)₃Cl: polystyrene beads with quaternary ammonium chloride
[b]determined by ¹H NMR of reaction mixture.
[c]PC: polycarbonate contents; calculated based on ¹H NMR of reaction mixture.
[d]calculated based on ¹H NMR of reaction mixture.
[e]Determined by GPC using tetrahydrofuran as the fluent and polystyrene as standard.
[f]1ˢᵗ time recycled initiator,
[g]2ⁿᵈ time recycled initiator.

Figure 3:
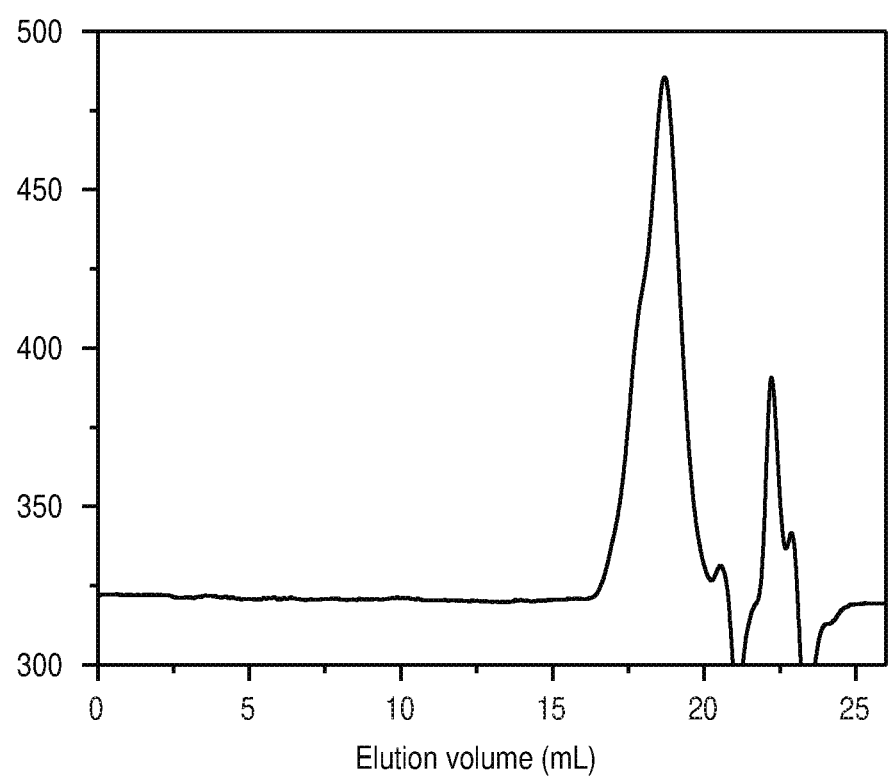
FIG. 3 is a graphical view of a GPC trace for entry 2 in Table 1, according to one or more embodiments of the present disclosure.

FIG. 3 is a graphical view of a GPC trace for entry 2 in Table 1, according to one or more embodiments of the present disclosure.

Figure 4:
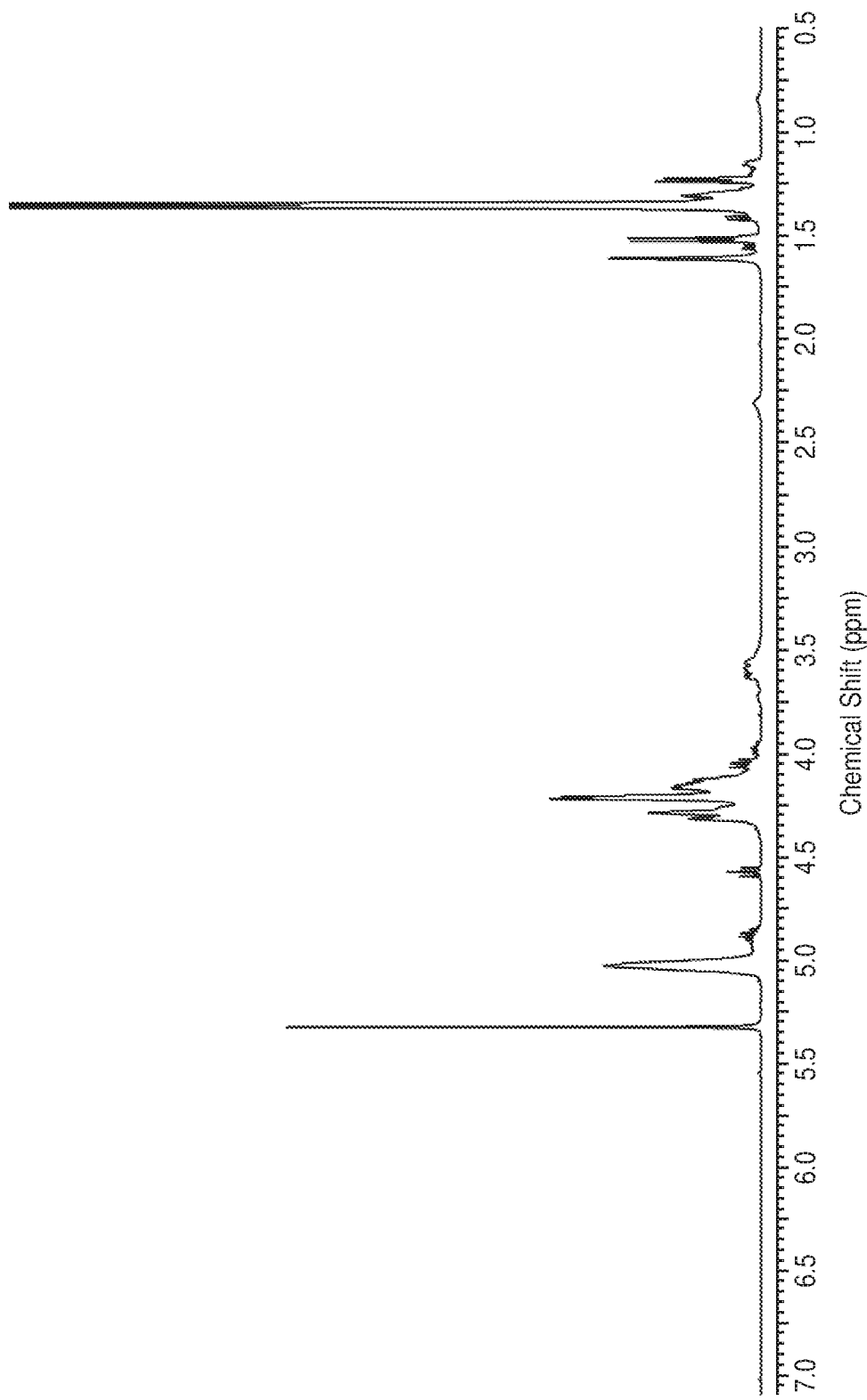
FIG. 4 is a $^1H$ NMR spectrum of poly(propylene oxide-co-propylene carbonate) for entry 2 in Table 1, according to one or more embodiments of the present disclosure.

FIG. 4 is a ¹H NMR spectrum of poly(propylene oxide-co-propylene carbonate) for entry 2 in Table 1, according to one or more embodiments of the present disclosure.

Figure 5:
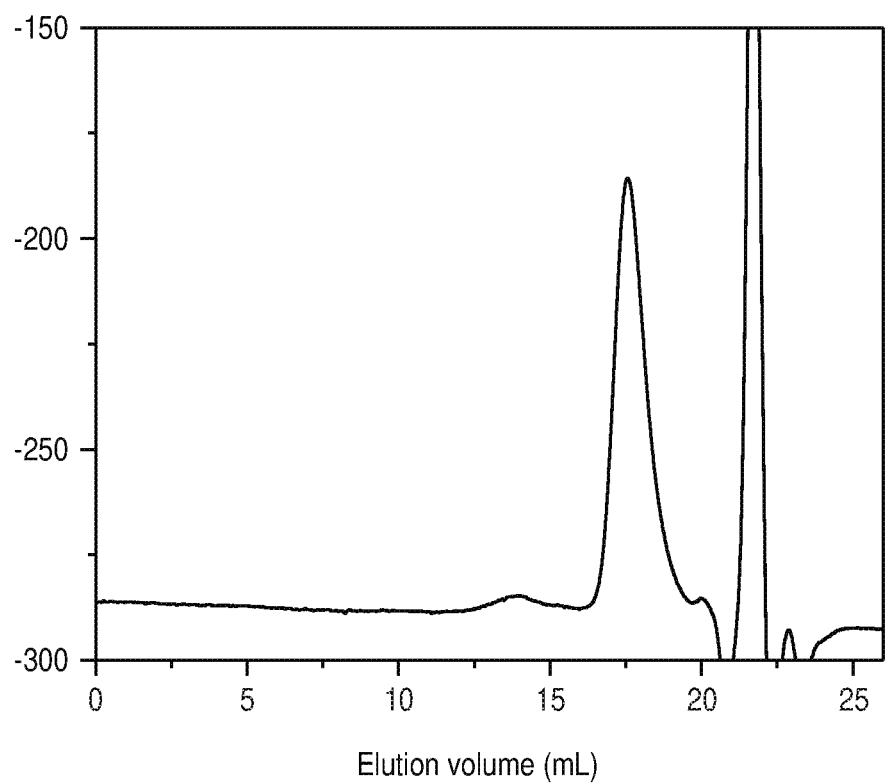
FIG. 5 is graphical view of a GPC trace for entry 3 in Table 1, according to one or more embodiments of the present disclosure.

FIG. 5 is graphical view of a GPC trace for entry 3[f] in Table 1, according to one or more embodiments of the present disclosure.

Figure 6:
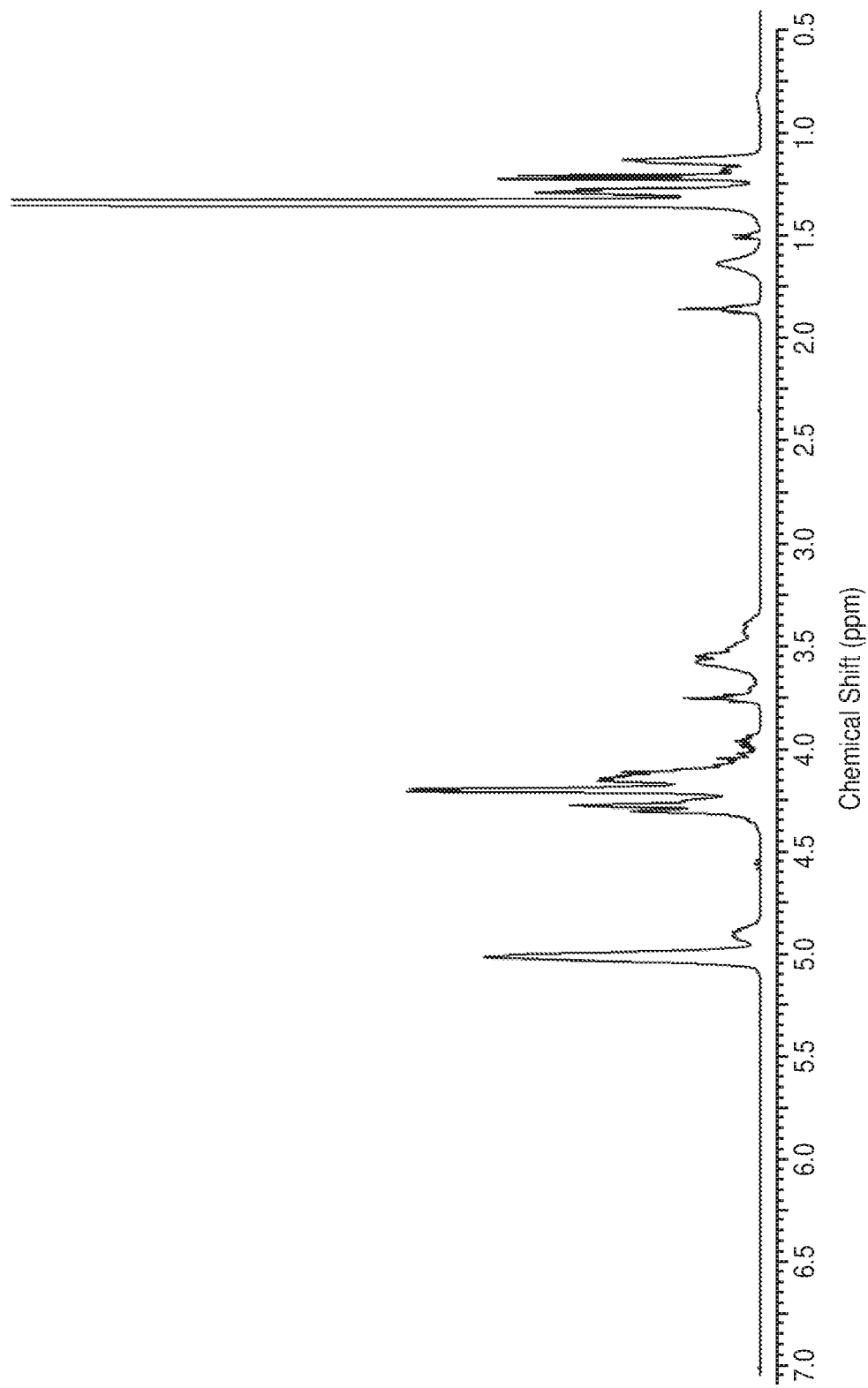
FIG. 6 is a $^1H$ NMR spectrum of the copolymer for entry 3 in Table 1, according to one or more embodiments of the present disclosure.

FIG. 6 is a ¹H NMR spectrum of the copolymer for entry 3[f] in Table 1, according to one or more embodiments of the present disclosure.

Figure 7:
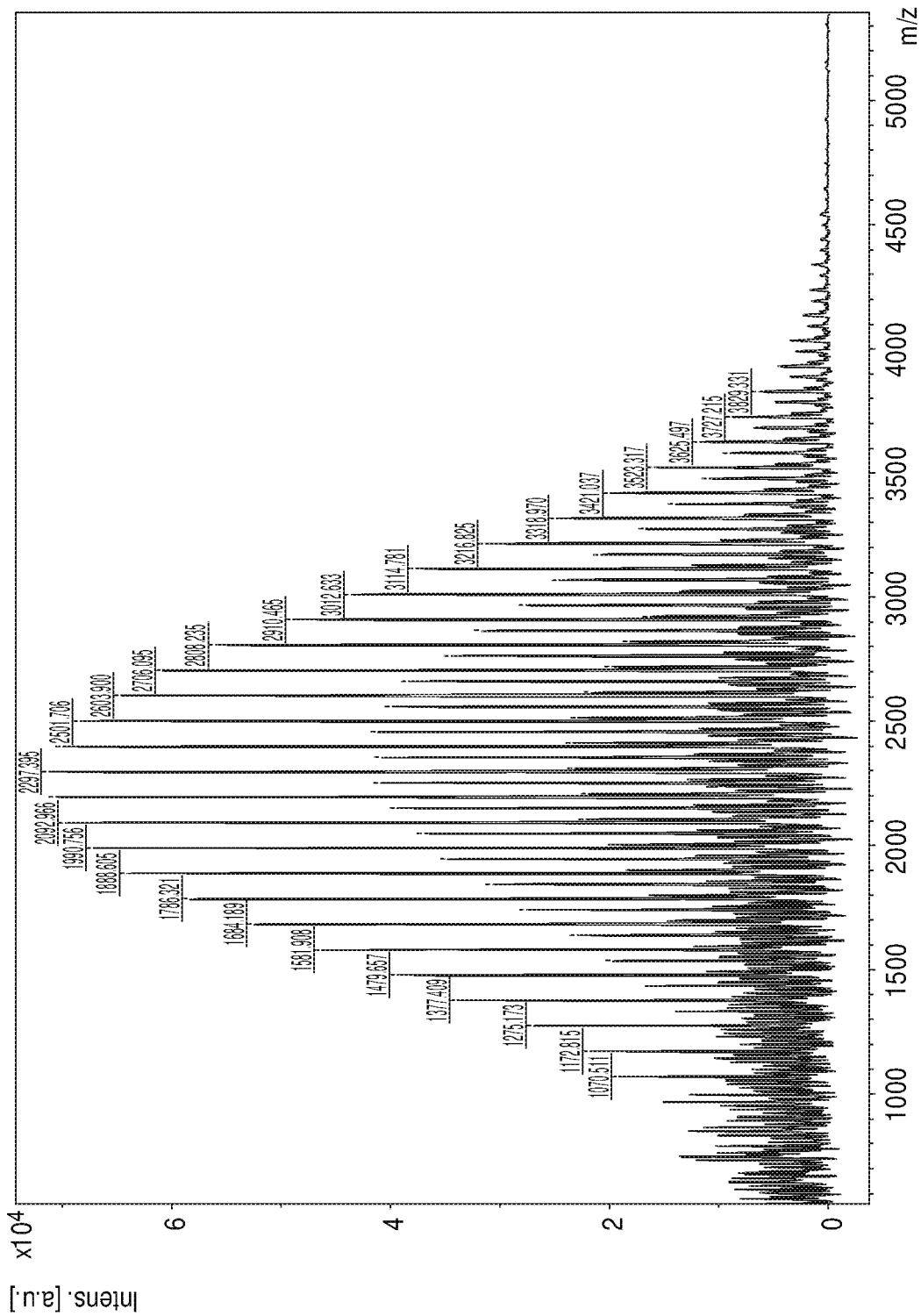
FIG. 7 is a MALDI-TOF spectrum of the copolymer for entry 3 in Table 1, according to one or more embodiments of the present disclosure.

FIG. 7 is a MALDI-TOF spectrum of the copolymer for entry 3[f] in Table 1, according to one or more embodiments of the present disclosure.

Figure 8:
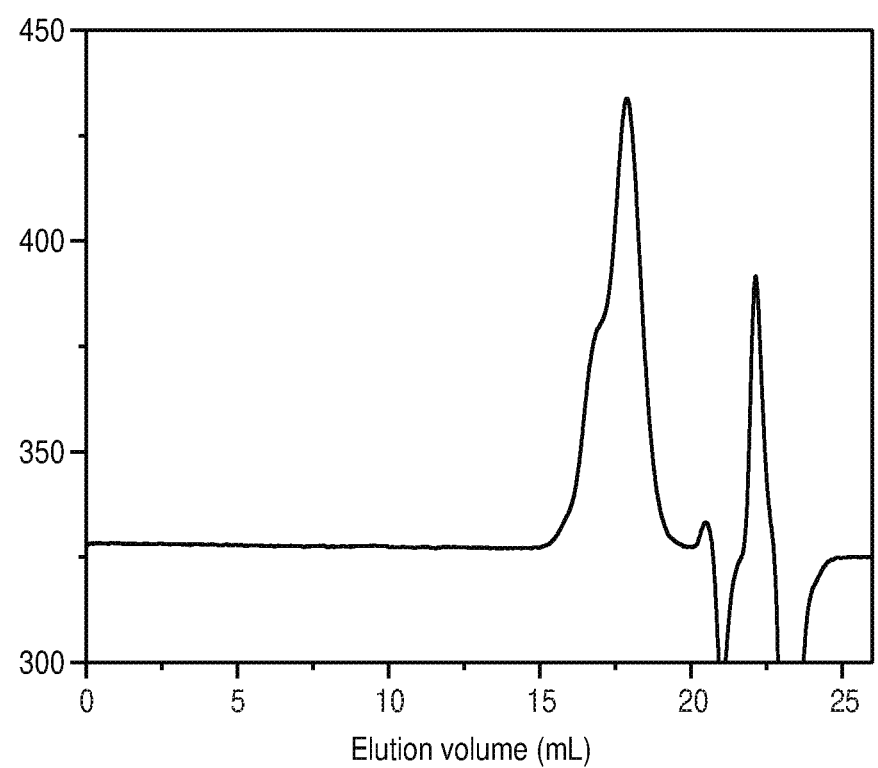
FIG. 8 is graphical view of a GPC trace for entry 6 in Table 1, according to one or more embodiments of the present disclosure.

FIG. 8 is graphical view of a GPC trace for entry 6 in Table 1, according to one or more embodiments of the present disclosure.

Figure 9:
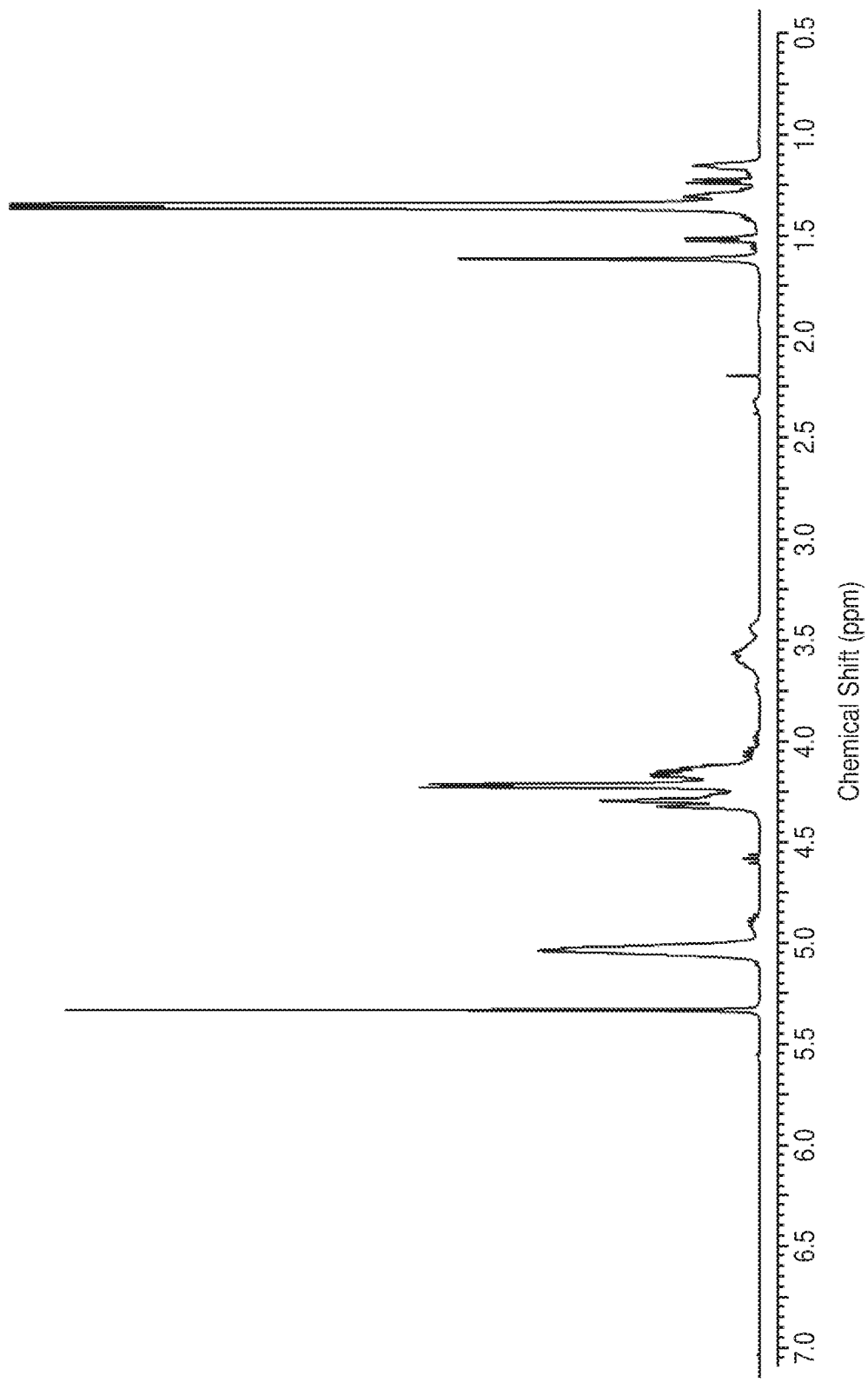
FIG. 9 is a $^1H$ NMR spectrum of poly(propylene oxide-co-propylene carbonate) for entry 6 in Table 1, according to one or more embodiments of the present disclosure.

FIG. 9 is a ¹H NMR spectrum of poly(propylene oxide-co-propylene carbonate) for entry 6 in Table 1, according to one or more embodiments of the present disclosure.

Figure 10:
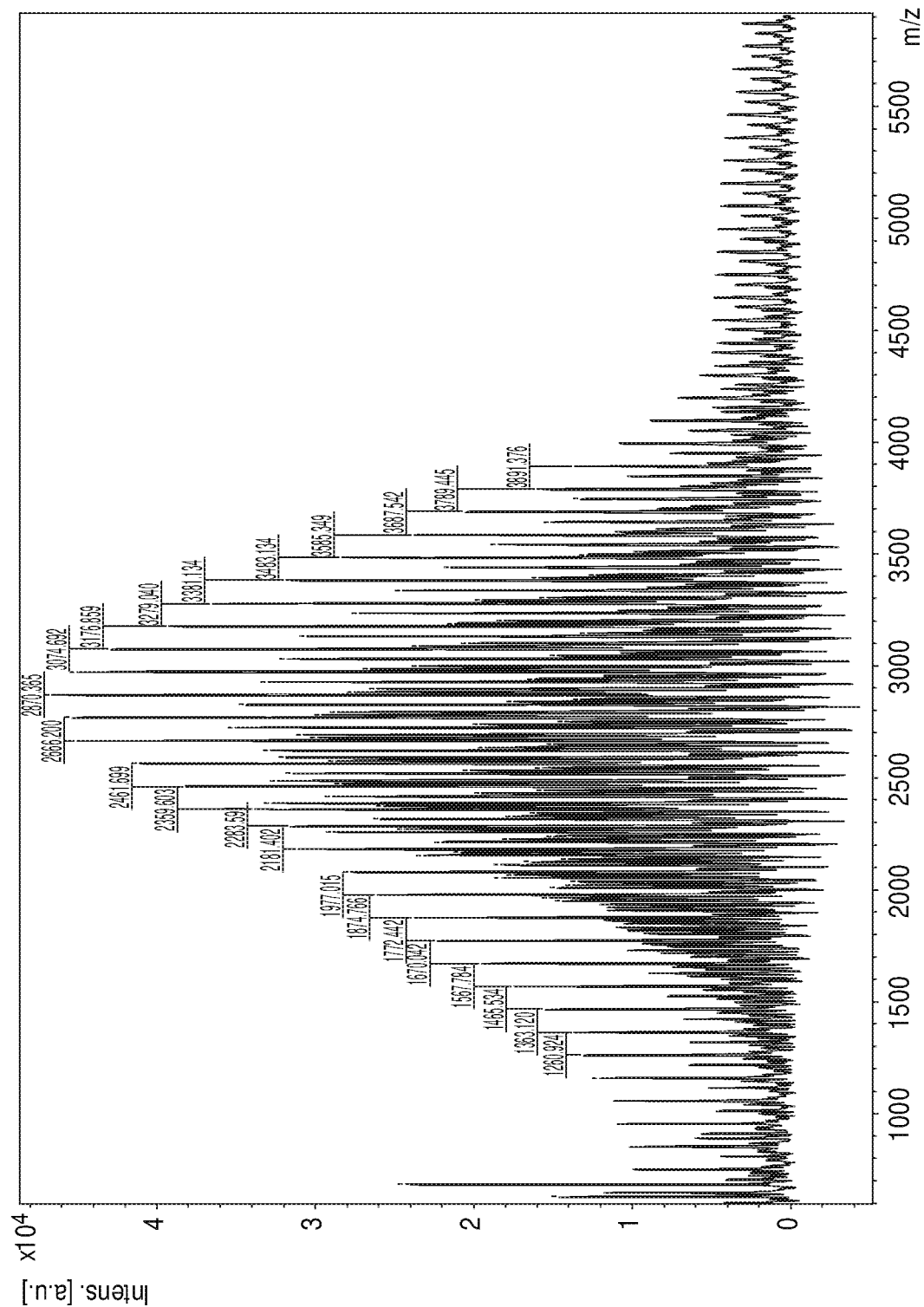
FIG. 10 is a MALDI-TOF spectrum of poly(propylene oxide-co-propylene carbonate) for entry 6 in Table 1, according to one or more embodiments of the present disclosure.

FIG. 10 is a MALDI-TOF spectrum of poly(propylene oxide-co-propylene carbonate) for entry 6 in Table 1, according to one or more embodiments of the present disclosure.

Figure 11:
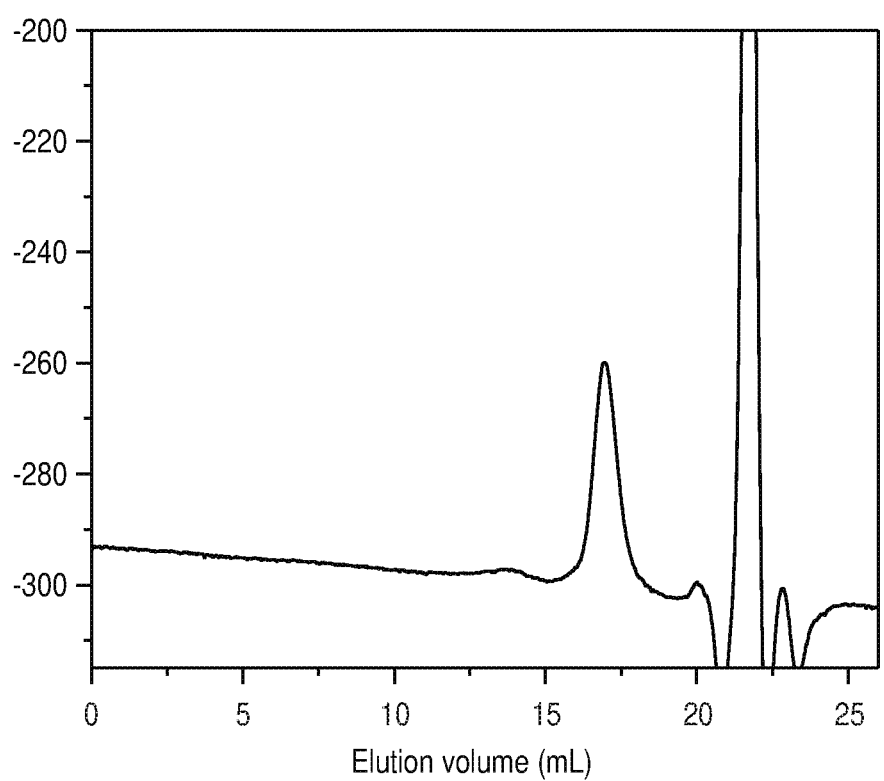
FIG. 11 is graphical view of a GPC trace for entry 9 in Table 1, according to one or more embodiments of the present disclosure.

FIG. 11 is graphical view of a GPC trace for entry 9 in Table 1, according to one or more embodiments of the present disclosure.

Figure 12:
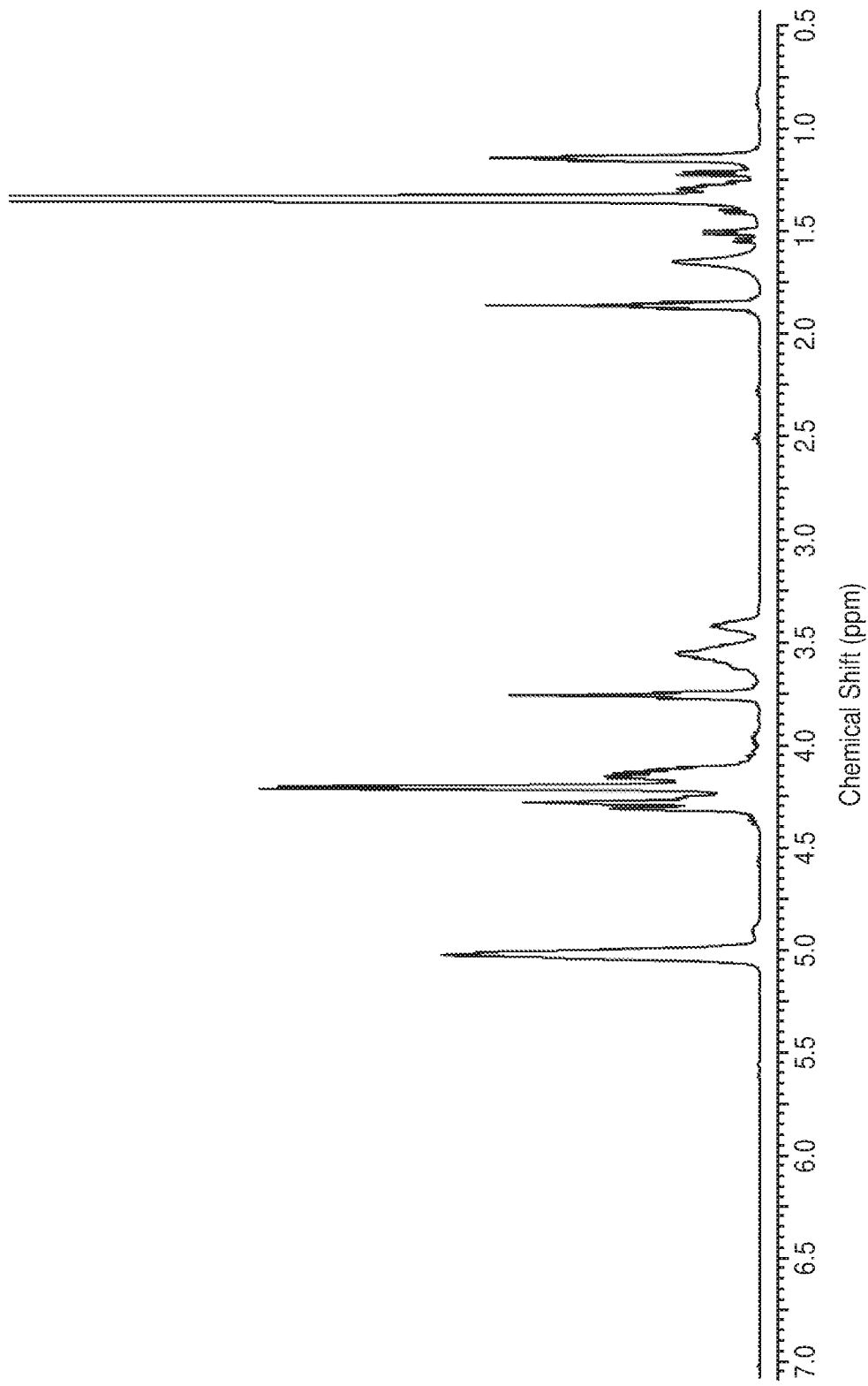
FIG. 12 is a $^1$H NMR spectrum of poly(propylene oxide-co-propylene carbonate) for entry 9 in Table 1, according to one or more embodiments of the present disclosure.

FIG. 12 is a ¹H NMR spectrum of poly(propylene oxide-co-propylene carbonate) for entry 9 in Table 1, according to one or more embodiments of the present disclosure.

Figure 13:
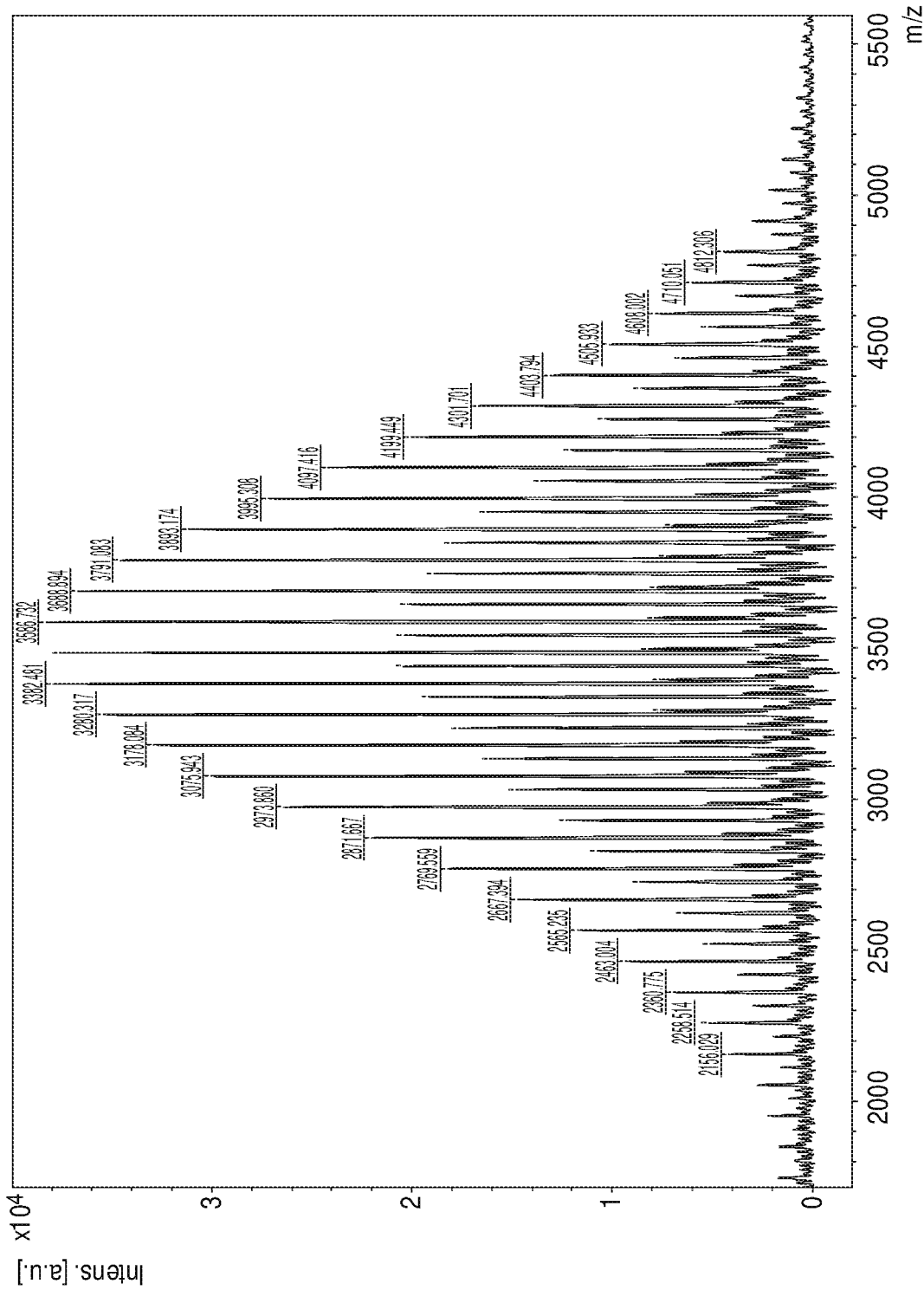
FIG. 13 is a MALDI-TOF spectrum of poly(propylene oxide-co-propylene carbonate) for entry 9 in Table 1, according to one or more embodiments of the present disclosure.

FIG. 13 is a MALDI-TOF spectrum of poly(propylene oxide-co-propylene carbonate) for entry 9 in Table 1, according to one or more embodiments of the present disclosure.

Figure 14:
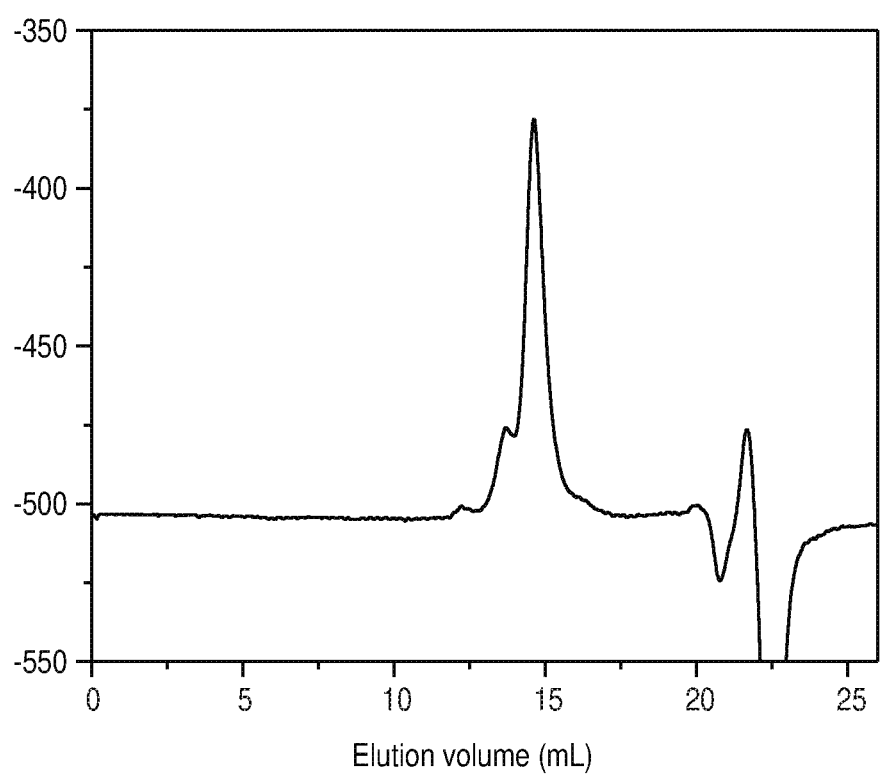
FIG. 14 is graphical view of a GPC trace for entry 12 in Table 1, according to one or more embodiments of the present disclosure.

FIG. 14 is graphical view of a GPC trace for entry 12 in Table 1, according to one or more embodiments of the present disclosure.

Figure 15:
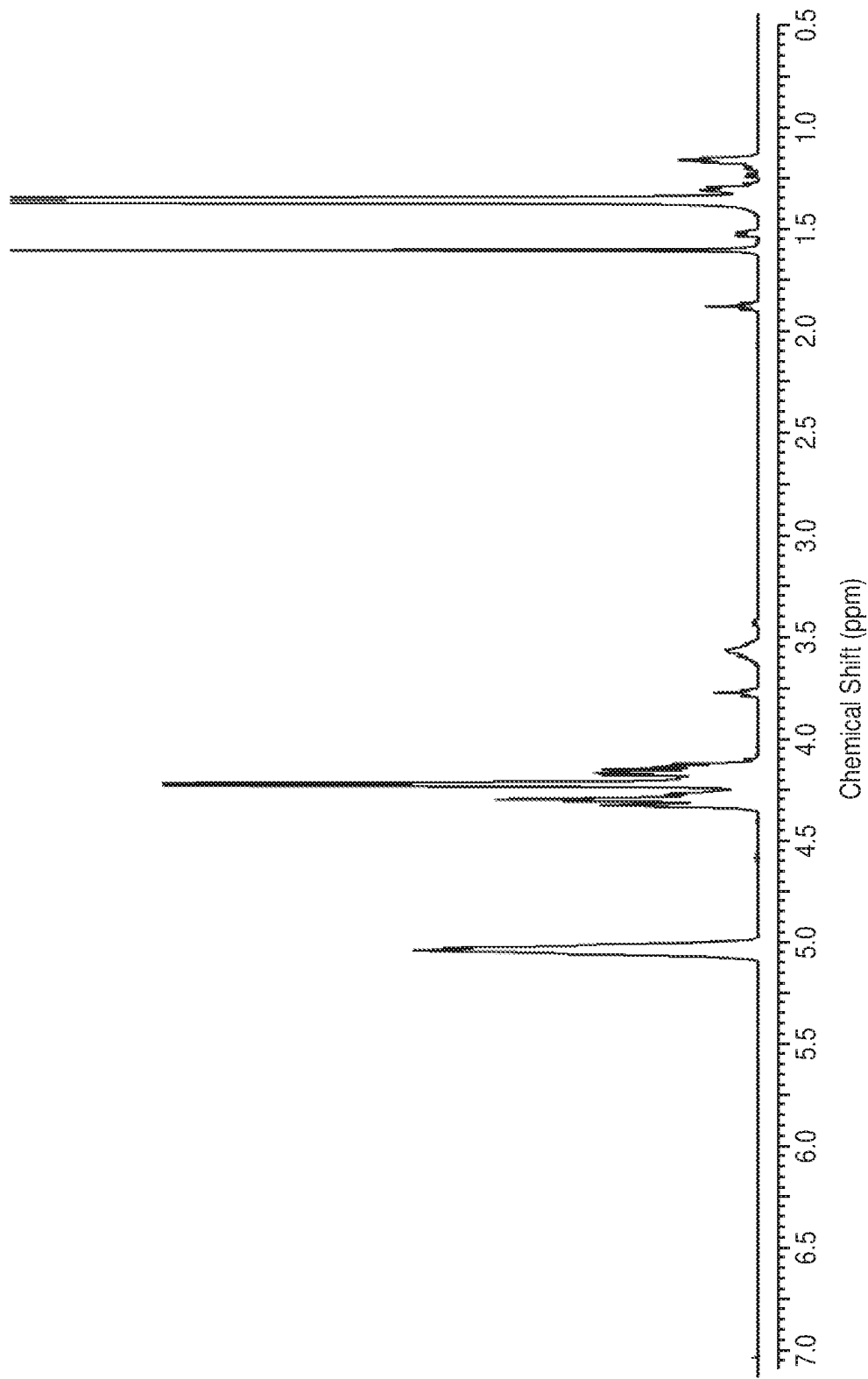
FIG. 15 is a $^1$H NMR spectrum of poly(propylene oxide-co-propylene carbonate) for entry 12 in Table 1, according to one or more embodiments of the present disclosure.

FIG. 15 is a ¹H NMR spectrum of poly(propylene oxide-co-propylene carbonate) for entry 12 in Table 1, according to one or more embodiments of the present disclosure.

Preparation of Polystyrene Beads with Quaternary Ammonium Chloride [PS—N(Bu)₃Cl]

The polystyrene beads with quaternary ammonium chloride salts were prepared by a novel modified suspension polymerization method. In a 100 mL three neck round bottom flask fitted with reflux condenser, a solution of gelatin (about 0.09 g), poly(diallyl-dimethylammonium chloride) (about 0.82 g) and boric acid (about 0.34 g) in about 30 mL water was stirred for about 5 min. The pH was adjusted to a pH of about 10 by 25% sodium hydroxide solution and stirred by mechanical stirrer for about 30 min with continuous argon purging through the solution. In the first stage, a mixture of styrene (about 7.3 g) divinylbenzene (DVB), (about 0.3 g) and AIBN (about 0.1 g) was added dropwise to aqueous solution. The reaction mixture was purged by argon for about 30 min with stiffing at about 400 rpm, then the reaction flask was dipped in preheated oil bath at about 70° C. and reaction was carried out for about 2 h. In second stage, a mixture of styrene (about 7.3 g), DVB (about 0.2 g) and 4-vinylbenzyl chloride (VBC) (about 5.2 g) purged by argon was added to reaction mixture over period of about 1 h and reaction was continued for about 17 h. The insoluble polymer beads were collected by filtration and washed several times by water, methanol and THF, dried in vacuum oven at about 40° C. for about 48 h to get beads of poly (ST-co-VBC). The beads were dispersed in dichloromethane (DCM) and stirred for about 30 min, then tributylamine was added and continued stirred for about 5 days at about 25° C. The polymer was filtered and washed several times with DCM, methanol and water. Dried in vacuum oven at about 40° C. for about 3 days. The polymer was characterized by elemental analyzer and found nitrogen content of about 2.178 wt. %

Preparation of Polystyrene Beads with Quaternary Ammonium Hydroxide [PS—N(Bu)$_3$OH]

The polystyrene beads with quaternary ammonium chloride [PS—N(Bu)$_3$Cl] (about 5 g) was stirred in about 100 mL 1M aqueous sodium hydroxide solution for about 2 h. Then the polymer was filtered, washed with water till the pH of eluent showed an about neutral pH and then with THF. Dried in vacuum oven at about 40° C. for about 72 h, and immediately transferred to glove box.

Representative Procedure of Copolymerization of CO$_2$ with Propylene Oxide (PO) from PS—N(Bu)$_3$OH initiator:

Take Entry 2 in Table 1 as an example. A 50 mL Pan reactor with magnetic stirrer and a small glass vial inside was first dried in an oven at about 120° C. overnight, then immediately placed into the glove box chamber. After keeping under vacuum for about 2-3 hours, the reaction vessel was moved into the glove box under argon atmosphere. About 200 mg (about 0.32 mmol) of polystyrene beads with tributyl phenyl ammonium hydroxide (PS—N(Bu)$_3$OH) was first added in glass vial and placed into the reactor, then about 1.7 equivalent of triethyl borane was mixed in hexane and transferred into glass vial and placed into the reactor. Propylene oxide (PO, about 0.448 mL, about 6.4 mmol) was carefully added into the reactor. The reactor was quickly sealed, taken out from the glove box and charged with CO$_2$ to a pressure of about 10 bar. After the whole system was kept at about 50° C. and copolymerization was carried out for about 10 h without stirring. The unreacted CO$_2$ was slowly released, and the polymer solution was quenched with water (about 0.5 mL). The crude product was diluted with Tetrahydrofuran and then centrifuged to remove cationic initiator (polystyrene beads). The THF solution was evaporated re-dissolved in small amount of THF and precipitated in water. The product was collected by centrifugation and dried in vacuum at room temperature until constant weight. The cationic initiators were washed with THF dried and collected for re-use.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. An initiator, comprising:
   an insoluble portion including an onium cation attached to an insoluble support; and
   an anion, wherein the anion is a counter-ion to the onium cation,
   wherein the onium cation and the anion form an onium salt characterized by the formula $Q^+(R)_nX^-$, wherein
   Q is N, P, or S;
   R is a butyl, octyl, or phenyl group;
   n is 3 or 4; and
   X is OH.

2. The initiator of claim 1, wherein the support is insoluble in a reaction medium.

3. The initiator of claim 1, wherein the insoluble support includes an organic material, inorganic material, or combination thereof.

4. The initiator of claim 3, wherein the organic material includes one or more of polystyrenes, polyamides, polyesters, polyvinylpyridinium salts, polyethylene oxides, polyethers, acrylic polymers, polysulfonates, polyolefins, and polysulfides.

5. The initiator of claim 3, wherein the inorganic material includes one or more of silica, aluminosilicate, zeolite, alumina, alumina-silica, titania, zirconia, ceria-zirconia, talc, magnesia, niobium oxides, tantalum oxides, molybdenum oxides, and tungsten oxides.

6. The initiator of claim 1, wherein a size of the initiator is at least about 200 nm.

7. A method of making a polycarbonate, comprising:
   contacting a cyclic monomer and a CO$_2$ in a presence of an activator and an initiator to form a polycarbonate in solution;
   wherein the initiator comprises an insoluble portion including an onium cation attached to an insoluble support, and an anion as a counter-ion to the onium cation;
   and further including one or more of
   contacting the polycarbonate solution with a deactivating agent to deactivate one or more of the initiator and activator;
   separating at least the insoluble portion of the initiator from at least the polycarbonate solution; and treating the insoluble portion of the initiator with a treatment solution to regenerate the anion of the initiator.

8. The method of claim 7, wherein a molar mass of the polycarbonates is less than about 10,000 g/mol.

9. The method of claim 7, wherein the cyclic monomer is characterized by the following chemical structure:

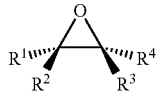

where each of $R_1$, $R_2$, $R_3$, and $R_4$ is independently one or more of alkyl group or containing functional groups such as one or more of halide, vinyl, azide, thiol, ether, ester, ketone, aldehyde, and acid.

10. The method of claim 7, wherein the cyclic monomer is one or more of the following chemical structures:

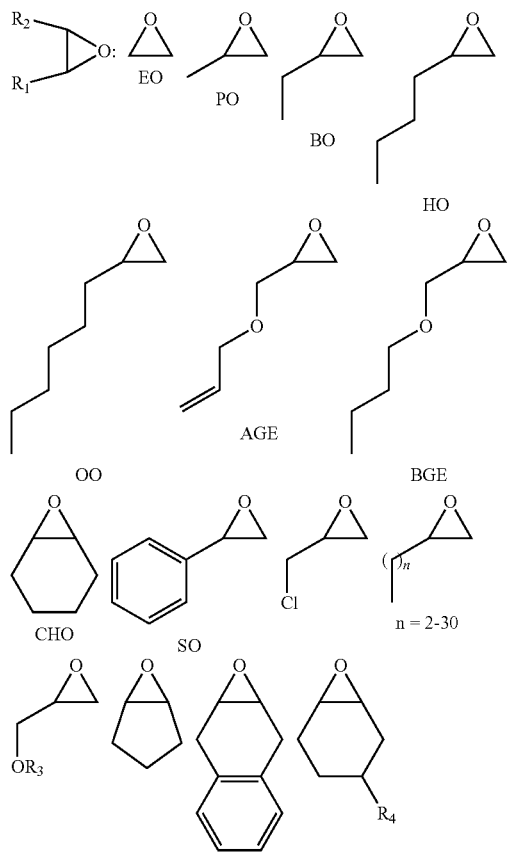

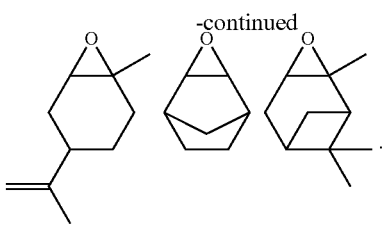

11. The method of claim 7, wherein the activator is provided in excess of stoichiometric conditions for the initiator.

12. The method of claim 7, wherein the activator includes one or more of triethyl borane, trimethyl borane, triisobutylborane, triphenyl borane, and triisobutyl aluminum.

13. The method of claim 7, further comprising treating the polycarbonate solution sufficient to precipitate the polycarbonate.

14. A method of making an initiator, comprising:
  contacting two or more monomers in an aqueous solution to form insoluble copolymer beads by suspension polymerization;
  mixing the insoluble copolymer beads in a solvent suitable for forming a dispersion; and
  adding one or more initiator precursors to the dispersion to form the initiator, wherein the initiator precursors include one or more of an onium salt, onium cation, and anion.

15. The method of claim 14, wherein the two or more monomers include one or more of styrene, divinylbenzene, and 4-vinylbenzyl chloride.

16. The method of claim 14, wherein the solvent includes dichloromethane.

17. The method of claim 14, wherein the onium salt includes tributylamine.

18. The method of claim 7, wherein the onium cation and the anion form an onium salt characterized by the formula $Q^+(R)_nX^-$, wherein
  Q is N, P, or S;
  R is a butyl, octyl, or phenyl group;
  n is 3 or 4; and
  X is OH.

19. The method of claim 14, wherein the initiator precursor includes the onium salt characterized by the formula $Q^+(R)_nX^-$, wherein
  Q is N, P, or S;
  R is a butyl, octyl, or phenyl group;
  n is 3 or 4; and
  X is OH.

* * * * *